Feb. 17, 1959        J. M. McCORMICK        2,873,855

ELECTRONIC MEMORY DEVICE FOR ARTICLE SORTING APPARATUS

Filed March 22, 1954

INVENTOR
JOHN M. McCORMICK
BY Rule and Hoge
ATTORNEYS

ELECTRONIC MEMORY DEVICE FOR ARTICLE SORTING APPARATUS

John M. McCormick, Toledo, Ohio, assignor to Owens-Illinois Glass Company, a corporation of Ohio Application March 22, 1954, Serial No. 417,887

6 Claims. (Cl. 209—90)

My invention relates to methods and apparatus for testing articles and selecting those having some predetermined characteristic and segregating them from the other articles. In many inspecting and selecting operations it is impractical for the actual setting out or segregating of a defective article or one with a particular characteristic, immediately or simultaneously with the inspection. Such separation must occur at a subsequent station or time. This requires a memory of some sort that must be incorporated in the system so that the selective mechanism can reject or segregate an article which has previously been selected by a separate inspection device.

The invention is of use, for example, in sorting articles such as bottles or jars and selecting and rejecting those having certain defects or classifying them as to certain dimensions or other characteristics. The invention may be used in weighing a series of articles and selecting and sorting them according to weight. A further use of the invention is in testing glass cane or tubing which is continuously formed by drawing it from a molten supply body and severing lengths of the drawn glass in succession to form individual tubes or canes. In such an operation the diameter of the glass is ordinarily tested by passing the continuous length of glass between gauging rolls which register the sections or portions of greater or less diameters than specified limits. These out of gauge portions then travel a distance equal to several lengths of the glass before reaching the point of severance. The invention is of utility in testing and selecting numerous other articles and materials.

It is common practice to employ mechanical memory devices such as toggles or sliding pins so arranged that they move in step with the articles being inspected, such toggles or pins actuated at one place by the inspecting device while a switch or other device controlling the selecting mechanism is located at another place and is actuated only by those toggles or pins which have been selected at the inspecting station. Such devices are intricate, contain many moving parts, are subject to wear, and to an accumulation of dust and dirt and present other objectionable features.

My invention provides a memory device which is wholly electrical and having no moving parts. Such a device may be entirely enclosed, if necessary, or if desired may be located at any convenient point remote from the inspecting and selecting mechanisms. The memory device in the preferred form herein illustrated and described is based on an incremental delay principle. It may be used, for example, in inspecting a multiplicity or continuous series of articles which travel singly and in succession through an inspection station at which they are inspected for some particular characteristic or defect, the articles then continuing their travel through a number of increments or steps to a selecting station at which they are selected or segregated from the remaining articles. When an article having a certain characteristic or defect reaches the inspection station the memory device will store and pass on information that the particular article having such characteristics is to be segregated or rejected at the selector station. The passing on of such information is by finite steps in timed relation to such increments or step movements of the inspected article and may be continued for any desired number of such steps, depending on the distance between the inspection and selector stations.

The memory apparatus embodies a combination of two types of similar known circuits or electronic units and comprises a series of individual units of each type.

Referring to the accompanying drawings.

Figures 1, 2:
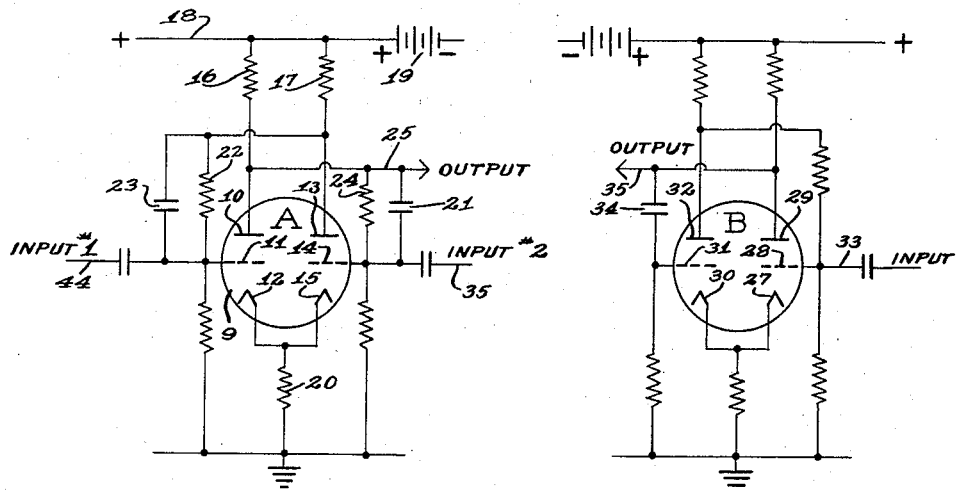
Fig. 1 is a diagrammatic view of an electrical circuit or unit, herein referred to as Type A.
Fig. 2 is a similar view of a unit referred to as Type B.

Referring to Fig. 1 the Type A unit includes two triodes, preferably in the same envelope 9. The first triode comprises a plate 10, grid 11 and cathode 12, the second comprises plate 13, grid 14 and cathode 15. The plates are connected through plate resistors 16 and 17 to the line 18 connected to the positive pole of battery 19. The cathodes are connected to ground through a resistor 20. The unit is wholly symmetrical, having input channels No. 1 and No. 2, connected respectively to the grids 11 and 14. The grid 11 is connected to the plate 13 through the resistance-capacitance coupling 22, 23. The grid 14 is in like manner connected to the plate 10 through the resistance-capacitance coupling 24, 21.

The unit A has two stable states, namely, one at which the first triode 10, 11, 12 is conducting, while the other triode is cut off, herein referred to as the first state. In the other stable state, herein referred to as the second or inverted state, the triode 13, 14, 15 is conducting and the first triode cut off. Assuming now that the unit is in the first stable state, with the first triode conducting, if a sharp negative impulse is applied through input channel No. 1 to the grid 11, the current flow through the triode is cut off owing to the negative bias of the grid. This results in a higher voltage on the plate 10. This higher voltage is transmitted through the resistance-capacitance coupling 24, 21 to the grid 14, the potential of which is thereby raised sufficiently to permit the second triode to conduct. A current flow is thus established through the second triode and thereby lowers the plate voltage of the plate 13. This lowered voltage is transmitted through the coupling 22, 23 to the grid 11 so that the voltage of the latter is lowered to a point below the cut off, thereby preventing current flow through the first triode. The unit is now in its inverted or second stable state. A negative pulse applied through input channel No. 2 to the grid 14 will operate to reverse the unit to its first stable state. It is to be noted that any negative pulses over the channel No. 2 while the unit is in its first stable state will have no effect on the unit. If the unit is in its inverted stable state with the second triode 13, 14, 15 conducting, the reinverting by an impulse applied over the input channel No. 2 will cause a negative pulse to be transmitted over the output channel 25.

The unit B (Fig. 2) is not symmetrical. It has a normally stable state in which the first triode 27, 28, 29 conducts while the second triode, 30, 31, 32 is cut off. By a suitable negative pulse applied through the input channel 33 to the grid 28, the first triode is momentarily cut off. This raises the plate voltage of plate 29 and the increased voltage is transmitted through a capacitor 34 to the grid 31, thereby raising the voltage of the grid to a point at which the second triode 30, 31, 32 will conduct. The current flow through this second triode lowers the plate voltage of the plate 32. This lowered voltage is transmitted to the grid 28 so that the voltage of the latter is lowered to a point below the cut-off, thereby preventing current flow through the triode 27, 28, 29. The unit is thus inverted from its initial stable state to a second state which is metastable or only temporarily stable and from which the unit automatically reverts after a short time delay determined by the circuit element values. This reversion causes a negative output pulse to be transmitted over the line 35.

In reference to the initial inversion of the unit B as above described it will be observed that when the plate voltage of the plate 29 is raised by the cutting off of the first triode, a positive pulse is transmitted over the output line 35. Since this line is always connected to a grid such as 28 of another stage (as hereinafter explained) and since in the stable state this grid is part of a triode which is conducting, the positive pulse causes only a slight increase in conduction and is in effect lost. However, after a short time interval the unit B automatically reverts as above explained. This reversion produces a negative output pulse which is transmitted over the line 35.

Figure 3:
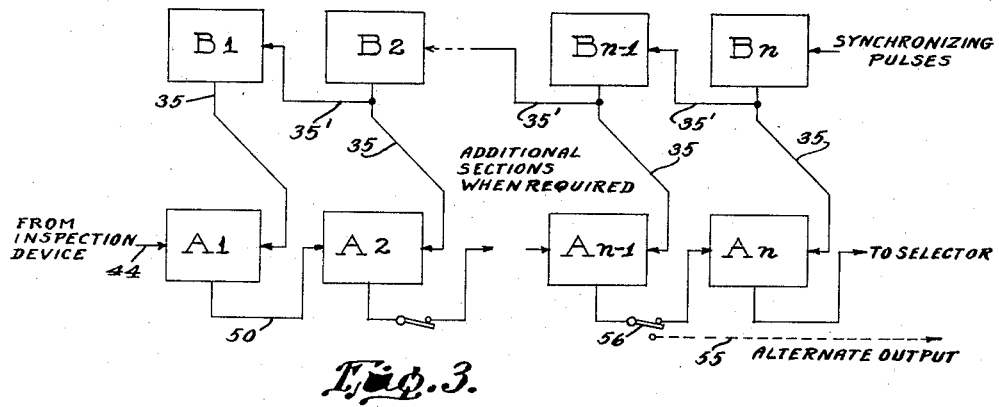
Fig. 3 is a block diagram of the memory device comprising two series of units of the Types A and B, respectively.

Referring to Fig. 3 the memory device comprises two series of units, namely, a series of A units, the individual units all being alike and a second series comprising an equal number of B units also all alike. The A and B units are arranged in pairs, there being as many pairs as there are steps or increments of delay between the inspection and the selection or segregation. The term "step" as herein used applies to the distance between each two succeeding articles of the series or the time interval between the arrival of two succeeding articles at a given point, whether the travel is intermittent or continuous.

Figure 4:
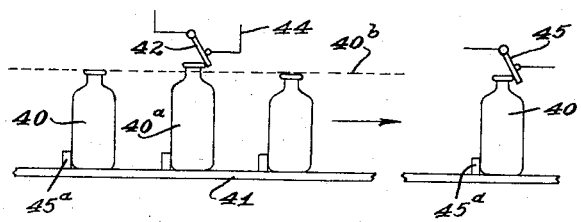
Fig. 4 is a diagrammatic view showing a series of articles being inspected and the inspecting and selecting devices.

The operation will now be described as used for selecting articles such as illustrated in Fig. 4. These comprise bottles 40 which are carried forward in an endless series on a continuously traveling conveyor 41. The articles are brought seriatim to the inspecting station where an inspecting device comprising a switch 42 is actuated by any bottle $40^a$ of the series which is taller than a prescribed maximum height indicated by the line $40^b$. The switch could be operated in a like manner by articles having some other characteristic. The switch 42 when operated completes a circuit through a battery which sends a signal in the form of an electrical pulse over the line 44 to the input No. 1 of the unit $A_1$. Each of the articles 40 advance beyond the inspection device through a number of steps or increments by which it is brought to the selecting station. As the articles advance a series of synchronizing negative pulses or electrical signals are produced as, for example, by a switch 45 (Fig. 4) actuated by each passing article 40, or by an element of the conveying mechanism operating periodically as the articles advance, as for example, by the flights $45^a$ on the conveyor. The switch closes a circuit through which the pulse is transmitted over the input channel 33 to the end unit $Bn$ (Fig. 3). This pulse operates (as heretofore described) after a short delay, for example, 20 microseconds, to produce a negative pulse which is transmitted over the output channel 35. This signal goes to the input channel No. 2 of the end unit $An$ and is also transmitted over line $35'$ to the input of unit $Bn-1$. After another such short delay a pulse is transmitted from unit $Bn-1$ to the input No. 2 of unit $An-1$ and also to the next B unit. This operation is repeated through each pair of units until after $n$ delays a pulse reaches the input No. 2 of unit $A_1$. Each individual delay between the impulses is so short that the whole time from the synchronizing pulse applied to $Bn$ to the pulse applied to $A_1$ is a small fraction of a second and only a small fraction of the time between successive synchronizing pulses. The pulses transmitted from the B units to the A units over the lines 35 have no effect on any of the A units while the latter remain in their first stable state.

When a defective article or an article to be selected reaches the inspecting device as, for example, the tall bottle $40^a$ (Fig. 4) which operates the switch 42, a negative pulse is transmitted over the line 44 to the input No. 1 of unit $A_1$. This causes the unit to invert to its second stable state, thereby recording that the bottle now being inspected is defective. Any additional impulse produced by such defective bottle and applied to the input No. 1 causes no additional change in the unit.

Figure 5:
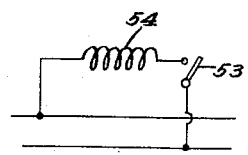
Fig. 5 is a diagrammatic view of an electromagnet forming a portion of an ejector.

Now as the articles advance and the synchronizing pulse applied to $Bn$ (following such inversion of unit $A_1$) is transmitted over the A and B series of units, it reaches the input No. 2 of the inverted unit $A_1$ so that the latter is reverted from its second stable state to its first stable state, and in so doing creates an output pulse which is transmitted over the line 50 to input No. 1 of unit $A_2$ causing the latter to invert and thus store the information that a defective bottle is in station No. 2, namely, one step or station beyond the inspection device. As the bottles advance another synchronizing pulse is applied to unit $Bn$ resulting in another succession of pulses being propagated so that a pulse reaches the unit $A_2$. As the latter is in its inverted state it sends out a pulse which inverts the next succeeding A unit thus passing on the information of the defective bottle. This process is repeated until the signal reaches the end unit $An$ which sends out the signal or pulse to the selector mechanism. This pulse may operate, for example, to close a switch 53 (Fig. 5) and thereby establish a circuit for the electromagnet coil 54. The latter forms a part of any selecting or ejecting apparatus for ejecting the selected article. For a full disclosure of such an ejecting apparatus, reference may be had to Owens, Patent 2,481,863, September 13, 1949, Photoelectric Apparatus for Detecting Surface Defects in Glassware, and the other patents referred to therein.

It is to be noted that the pulse derived from the synchronizing pulse which reached the inverted unit $A_2$ and caused it to revert to normal was momentarily ahead of the similar pulse which (delayed by transmittal through unit $B_1$) went to unit $A_1$. This clears unit $A_2$ and makes it ready to receive information regarding the next bottle coming along. It should also be noted that any A unit which is in its normal state is not affected by the pulse from its corresponding B unit and therefore does not produce an output.

If it is desired to apply the memory device in a station where the number of steps or delays from the inspection to the selector is changed the final output from the A series may be taken from other than the last stage. This is indicated by the dotted line 55 (Fig. 3). All that is needed to make the change is the operation of a switch 56.

The method herein disclosed and claimed may be used for inspecting glass tubing, cane or other materials which are advanced through the inspection station in a continuous strip or length before the sections or lengths which form the articles under inspection have been severed from the supply body. The term "articles" as herein used applies to such sections or lengths both before and after such severance.

Modifications may be resorted to within the spirit and scope of my invention.

I claim:

1. Apparatus for transmitting electrical signals, said apparatus including a memory device comprising a first series of electrical units and a second series comprising the same number of electrical units, each unit of the first series having two separate stable states, two intake channels and an output channel, each unit of the second series having an input channel and an output channel, means for applying synchronizing pulses at timed intervals to a unit of the second series, means for transmitting the signal produced by each pulse to the remaining units of said second series in succession and for transmitting the signal through intake channels to the units of the first series in succession, means for applying pulses through the other intake channels of the units in the first series, and for transmitting signals from one to another of the units of the first series through channels extending from the output of each unit of said first series to the first input of the next succeeding unit of the series.

2. Apparatus for inspecting articles and selecting therefrom those having a given characteristic, said apparatus comprising means for advancing the articles from an inspection station to a selector station by a plurality of increments or steps, the articles being brought in succession to a station at equal time intervals, an electro-responsive inspection device positioned and arranged to be actuated by each of said articles having the said characteristic when the article reaches the inspection station and thereby producing an electrical signal, a first series of electrical units each having two stable states and two intake channels and an output channel and being invertable from its first to its second stable state by a pulse applied through the first intake channel and revertible to its first stable state by a pulse applied through the second intake channel and operable to transmit a pulse through the output channel when the unit is re-inverted to its first state, means for producing a synchronizing pulse for each article reaching the selector station, a second series of electrical units, means for applying said synchronizing pulses to a unit of said second series and transmitting the pulse signal from unit to unit of the second series, and means for transmitting a pulse from each unit of the second series to the second input of the corresponding unit of the first series and thereby reinverting to its stable condition each unit of the first series which has been inverted by a signal from the inspection device, whereby the signal is transmitted step by step through the units of the first series to the selector station, and a selector device operable by the transmitted signal for selecting the articles having said characteristic.

3. A memory apparatus for use in selecting from a multiplicity of articles those having a given characteristic, said apparatus comprising a first series of electrical units and a second series having an equal number of electrical units, the units of the two series being in pairs, the units of the first series each having an output terminal and two input terminals and each having a first stable state and a second stable state and each being invertible from one stable state to the other by the application of a voltage pulse to one output terminal opposite to the existing voltage on the other output terminal, each of the units of said second series having an output terminal and an input terminal and being invertible from a stable state by a voltage pulse applied to its input terminal over an input channel and automatically revertible to its said stable state after a short time interval, electrical connections by which an output signal from each unit of said second series is transmitted to and through the second input channel of the corresponding unit of the first series and by which the signal is also transmitted to the next succeeding unit of the second series, whereby the synchronizing pulse effects the transmission of pulses through the second series of units and signals are transmitted to the units of the first series in succession, and electrical connections between the successive units of the first series through which, when a unit is reinverted by a signal from the corresponding unit of the second series, an output signal is transmitted to the next succeeding unit of the first series.

4. Apparatus for transmitting electrical signals comprising electrical units including a first series and a second series having an equal number of units, the units of the first series being paired with the units of the second series, means for applying synchronizing pulses at time intervals to a unit of the second series, means for causing each pulse to transmit a signal through the units of said second series by a series of pulses each transmitting the signal from one unit to the next, means for applying an operating signal to a unit of the said first series and transmitting the operating signal through the units of the first series in the reverse direction, and means for transmitting controlling signals from the units of said second series to the corresponding units of the first series and thereby controlling the transmission of the operating signal.

5. Apparatus for testing articles for a predetermined characteristic as they are brought seriatim to a testing station and segregating the articles having such characteristic at a selecting station beyond the testing station to which they are brought singly and in succession by a series of steps between said stations, which apparatus comprises a first series and a second series of electronic units, each series corresponding in number to the number of said steps, each of said units of the first series having two stable conditions and two input channels and two input terminals and operable by a pulse applied to the first input terminal to invert the unit from a normal stable condition to an inverted stable condition and revertible to its normal stable condition by a pulse applied to the second input terminal, each unit of the second series having an output terminal and an input terminal and being invertible from a stable to a metastable condition by a pulse applied to the input terminal of the unit and automatically revertible to the stable condition after a time delay, means for producing an electrical pulse as each article is brought to the selecting station and applying the pulse to the end unit of said second series and thereby inverting said end unit, electrical connections between the units of said second series through which the signal is transmitted to the remaining units of the series singly and in succession, each unit when it receives a pulse operating after a time delay to transmit a pulse to the next succeeding unit of the series, electrical connections between the units of the two series through which a pulse is transmitted from each unit of the second series to the corresponding unit of the first series when said unit of the second series is inverted to its metastable condition, the pulse being applied to the second input terminal of the said corresponding unit, means operable, when an article at the testing station discloses said characteristic, to apply a pulse to the first input terminal of the first unit of the first series and thereby invert it to its second stable condition, electrical connections between the units of the first series through which, when a unit of the first series is reinverted to its first stable condition by a pulse transmitted from the corresponding unit of the second series, a pulse is transmitted to the next succeeding unit of the first series and thereby inverts it to its second stable condition, and an electro-responsive selecting device operable by a pulse transmitted from the final unit of the first series when said final unit is reinverted to its first stable condition.

6. Apparatus for inspecting a series of articles and selecting therefrom those having a given characteristic, said apparatus including means for advancing the articles in succession from an inspection station to a selector station by a series of increments or step advances, said apparatus including electro-responsive means at the inspection station operable by an article at the inspection station having said characteristic for producing an electrical pulse, a first series of electro-responsive units corresponding in number to the number of said step advances between the said stations, a second series of electro-responsive units equal in number to those of the first series, the units of the second series being paired with the units of the first series, the units of said second series being electrically connected, means for producing synchronizing pulses and transmitting them through the said units of the second series, means operable by an article at the inspection station having said characteristic to produce an electrical signal and apply it to the first unit of said first series, electrical connections through which said signal is transmitted from unit to unit of said first series, electrical connections through which pulses are transmitted from the units of the second series to the units of the first series, said last mentioned pulses being operative to control the transmission of the signal through the units of the first series, and a selector at the selector station operative by the signal transmitted through said units of the first series.

References Cited in the file of this patent

UNITED STATES PATENTS

| | | |
|---|---|---|
| 2,346,583 | Jackson | Apr. 11, 1944 |
| 2,404,047 | Flory et al. | July 16, 1946 |
| 2,418,521 | Morton et al. | Apr. 8, 1947 |
| 2,539,998 | Holland-Martin et al. | Jan. 30, 1951 |
| 2,550,116 | Grosdoff | Apr. 24, 1951 |
| 2,689,647 | Hofstetter et al. | Sept. 21, 1954 |
| 2,732,896 | Lundahl | Jan. 31, 1956 |